United States Patent [19]

Arbabzadah et al.

[11] Patent Number: 4,794,642
[45] Date of Patent: Dec. 27, 1988

[54] CALL SCREENING IN A PUBLIC TELEPHONE STATION

[75] Inventors: Mohammad A. Arbabzadah; Richard L. Maybach; Bhaskar N. Sanakkayala, all of Holmdel; S. Devendra K. Verma, Middletown, all of N.J.

[73] Assignees: American Telephone and Telegraph Company, AT&T Bell Laboratories, Murray Hill; AT&T Information Systems Inc., Morristown, both of N.J.

[21] Appl. No.: 100,697

[22] Filed: Sep. 24, 1987

[51] Int. Cl.⁴ .................. H04M 1/27; H04M 1/66; H04M 15/24
[52] U.S. Cl. ................................ 379/200; 379/36; 379/132; 379/144; 379/145
[58] Field of Search ............... 379/36, 145, 144, 132, 379/112, 200, 157

[56] References Cited

U.S. PATENT DOCUMENTS

| | | | |
|---|---|---|---|
| 3,985,972 | 10/1976 | Rolin et al. | 379/197 |
| 3,996,425 | 12/1976 | Low et al. | 379/158 |
| 4,012,602 | 3/1977 | Jackson | 379/200 |
| 4,278,844 | 7/1981 | Jones | 379/157 |
| 4,314,108 | 2/1982 | Sharvit | 379/188 |
| 4,332,982 | 6/1982 | Thomas | 379/200 |
| 4,425,480 | 1/1984 | Tischin | 379/200 |
| 4,595,983 | 6/1986 | Gehalo et al. | 379/36 X |

Primary Examiner—Thomas W. Brown
Attorney, Agent, or Firm—Samuel R. Williamson

[57] ABSTRACT

Control equipment employed in a customer-owned public telephone station prevents a user from making unauthorized telephone calls in a telephone system. Operating under the control of a computer in the station, the control equipment employs a call screening process which restricts the telephone numbers a user can dial to those numbers preselected by a station owner. The telephone numbers are categorized in multiple but distinct groups, each of which represents a specific class of telephone call. The control equipment is responsive to momentary loop breaks occurring on tip and ring lines connecting the station to a central office, and to a loop break provided by the central office which reflects that the far end party has disconnected. The control equipment is also responsive to scheduled as well as unscheduled receipt of dial tone. The combination of the call screening process along with the ongoing loop break and dial tone detection and analysis conveniently provides the desired protection so that the user will be properly charged for telephone calls made from the station. The restrictions incorporated in the station for obtaining this protection are applied with minimal inconvenience for the legitimate user.

12 Claims, 4 Drawing Sheets

CALL SCREENING IN A PUBLIC TELEPHONE STATION

BACKGROUND OF THE INVENTION

1. Technical Field

The present invention relates to public telephone stations and more specifically, to control equipment within a public telephone station that guards against a user making unauthorized telephone calls.

2. Description of the Prior Art

Public telephone improvement programs in the last decade have resulted in a multitude of telephone station innovations that serve customer needs and reduce operating costs. Illustratively, one such product is the customer-owned public telephone station. These are telephone stations that are purchased by non-telephone company customers who then lease or resell the stations.

Many services available for a telephone company-owned public telephone station are not available for the customer-owned public telephone station. For example, a telephone company-owned public telephone station operating on a charge-a-call line is provided with call screening, call blocking, call rating, and fraud protection through the telephone company's traffic service position system (TSPS) facilities for noncommercial credit card calls and through the telephone company's call processor for commerical credit card calls.

The customer owned public telephone station is usually connected to a central office via a measured business service line (1MB). This line accepts all outgoing calls and, therefore, provides greater opportunity for user fraud. To minimize the occurrence of such fraud, a restriction should be provided at some point on the measured business service line to limit the telephone calls originating at the station to those authorized by the station owner. Furthermore, when the far end party disconnects at the end of a telephone call and the user of the telephone station remains off-hook, the central office may possibly restore dial tone. Without additional protection, therefore, the user may then place a call that would be free to the user but billed to the lessor of the measured business service line.

In view of the foregoing, it is apparent that a need exists for control equipment that prevents fraudulent use of a customer-owned public telephone station.

SUMMARY OF THE INVENTION

In accordance with the invention, control equipment employed in a customer-owned public telephone station prevents a user from making unauthorized telephone calls on a telephone line. Operating under the control of a computer in the station, the control equipment employs a call screening process which restricts the telephone numbers a user can dial to those numbers preselected by the station owner. The telephone numbers are categorized in multiple but distinct groups, each of which contains a specific class of telephone calls. Telephone numbers in a first group are those to which no calls may be made. Telephone numbers in a second group are those to which calls may be made at no cost. And telephone numbers in a third group are those to which charge calls may be made. Operation of the call screening process is such that each digit of a telephone number entered at the station is examined to insure that it falls into one of the multiple groups defined by the station owner. Dialing the digits of a number falling in the first group causes the station to generate a reset signal for preventing the completion of the telephone call. Digits falling in the second and third groups are permitted to be dialed. Once a digit is examined, and if found to be in one of these two groups, it is transmitted by the station over the telephone line to the central office. If the digits in a dialed telephone number fall outside one of the multiple groups, the call screening process considers the number invalid and the number is blocked in the same manner as those numbers in the first group.

The control equipment is configured to be responsive to momentary loop breaks occurring on tip and ring lines connecting the station to a central office, and those loop breaks provided by the central office that reflect that the far end party has disconnected. The control equipment is also configured to be responsive to scheduled as well as unscheduled receipt of dial tone.

In response to the reception of both a loop break and a dial tone from the central office, the control equipment either activates the call screening process at the station or terminates a telephone connection then existing between the station and the central office. If the telephone connection between the station and the central office is established by an incoming call to the station, the control equipment activates the call screening process upon receipt of both the loop break and dial tone. But if the telephone connection between the station and the central office is established by an outgoing call from the station, the control equipment terminates the telephone connection then existing between the station and the central office upon receipt of both the loop break and dial tone.

The combination of the call screening process along with the ongoing loop break and dial tone detection and analysis conveniently provides the desired protection against unauthorized operation of the customer-owned public telephone station in the telephone system. The restrictions incorporated in the public telephone station for attaining this protection are applied with minimal inconvenience for the legitimate user.

BRIEF DESCRIPTION OF THE DRAWING

The invention will be more clearly understood from a consideration of the following detailed description of an illustrative embodiment of the invention and the accompanying drawing in which.

DETAILED DESCRIPTION

Figure 1:
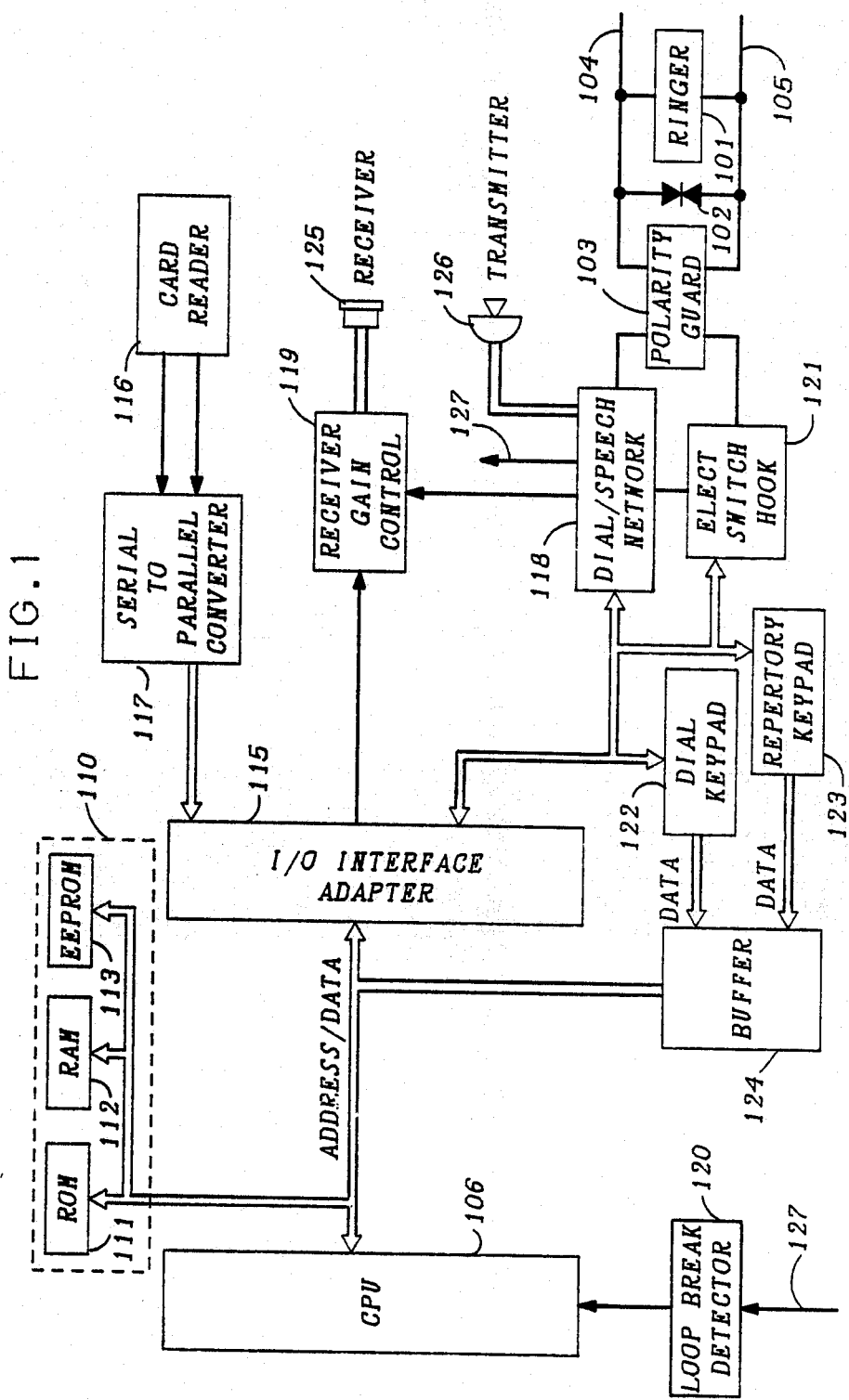
FIG. 1 shows a block diagram of the major functional components of a customer-owned public telephone station.

Referring now to FIG. 1 of the drawing, there is shown a block diagram of a customer-owned public telephone station having a ringer 101, a varistor 102 and a polarity guard 103, which are included to show an illustrative connection between a telephone station and the tip and ring terminals 104, 105 of a telephone line in accordance with the invention. The numerous features and functions of the public telephone station are controlled by a central processing unit (CPU) 106. CPUs are commercially available. A CPU commercially available from Intel Corporation as Part No. 80C31 can be used for CPU 106 with the proper programming.

The telephone station also includes a memory section 110, which interfaces with and stores data for proper operation of the CPU 106. This memory section comprises read only memory (ROM) 111, random access memory (RAM) 112 and electrical erasable programmable read only memory (EEPROM) 113. In general ROM stores the control program, which is loaded by the manufacturer at the factory; RAM contains transient data that need be remembered only while a call is being made; and EEPROM contains the tables of blocked, free, and charge calls, which are loaded by the owner. Connected to the CPU 106 and the memory section 110 is a peripheral input/output interface adapter 115, which includes interface circuitry and multiple ports for interfacing the CPU 106 with other circuitry in the telephone station. This adapter 115 also contains additional random access memory for processing calling card data obtainable from a card having a magnetic stripe and read by a magnetic stripe card reader 116. A serial to parallel converter 117 converts the serial data from the card reader 116 into a parallel format and then couples this data to the adapter 115. This data is ultimately coupled by the station via the tip and ring lines 104, 105 to a call processor associated with the station, but usually located remote therefrom. A timer in the adapter 115 provides the timing for the data that is input from the magnetic stripe card reader 116.

Power for operation of the station is provided from a telephone central office or switching facility (not shown) over a measured business line to the tip and ring terminals 104, 105. Full operation of the station is possible on as little as 18 milliamps. If the current over this loop from the central office should drop to below 18 milliamps, the CPU 106 enters an idle state for a reduced power operating condition allowing a speech-only mode described later herein. A second timer in the adapter 115 remains active for counting instruction cycles when the CPU 106 enters this idle state.

Other circuitry in the station includes a dial/speech network 118, a receiver gain control 119, a loop break detector 120 and an electronic switch hook 121.

The dial/speech network 118 contains a speech hybrid for separating and combining the appropriate received and transmit audible signals, respectively, for a receiver 125 and a transmitter 126, a touch-tone synthesizer for generating tones reflective of the digits entered on a dial key pad 122, as well as mode control circuitry connected via the interface adapter 115 to the CPU 106. The mode control circuitry determines if sufficient loop current is available over the tip and ring lines to enter a full-feature mode. In this full-feature mode, the dial/speech network 118 is allowed to outpulse tone signals to the tip and ring terminals 104, 105. As indicated, with a loop current of less than 18 milliamps, the mode control circuit configures the station in the speech-only mode. In this speech-only mode, the station can transmit and receive speech signals but cannot perform any other functions. As the loop current increases to 18 milliamps or greater, the circuit switches to the full feature mode. The dial/speech network 118 also detects when a loop break occurs. A loop break is an interruption of the current in the loop formed by the central office, the tip and ring lines and the telephone station. This loop break information is provided over line 127 to the loop break detector 120.

The loop break detector 120 provides the loop break information to the CPU 106 in the form of an interrupt signal as each loop break occurs. The CPU 106 then determines if the interrupt signal is a valid loop break by examining the state of the electronic switch hook 121. If the switch hook 121 has been operated, then opening of the loop occurred therein and the loop break is not considered valid. If the loop break occurred elsewhere (on the tip and ring lines or at the central office), it is considered valid. For a valid loop break, the CPU 106 sets all circuits to a low power state, and the station goes into the speech-only mode while the loop break exists. When the loop break ends, the station exits the speech-only mode and returns to the full-feature mode.

Certain users of the station may have need for the receiver 125 to operate at some amplification level above the nominal level. The receiver gain control 119 provides this amplification to the received signal by operating at three levels; nominal gain, 6 dB above nominal gain and 12 dB above nominal gain. The receiver gain control is connected to the dial/speech network 118 for receiving the received signal and to the adapter 115 for receiving appropriate control information.

Telephone number input into the station by a user is through key pad circuitry comprising the dial key pad 122 and a repertory key pad 123. The dial key pad 122 is used for normal dialing of the digits between zero and nine for a regular telephone call. The star and pound key are also included on the dial key pad 122 for those functions where they are required. The repertory key pad 123 provides access to a collection of telephone numbers prestored by the owner of the customer-owned telephone station. These are numbers which the customer has access to and may dial by depressing only one or two digits. Information from the key pads 122, 123 is provided to a buffer 124 which is read by the CPU 186.

Figure 2:
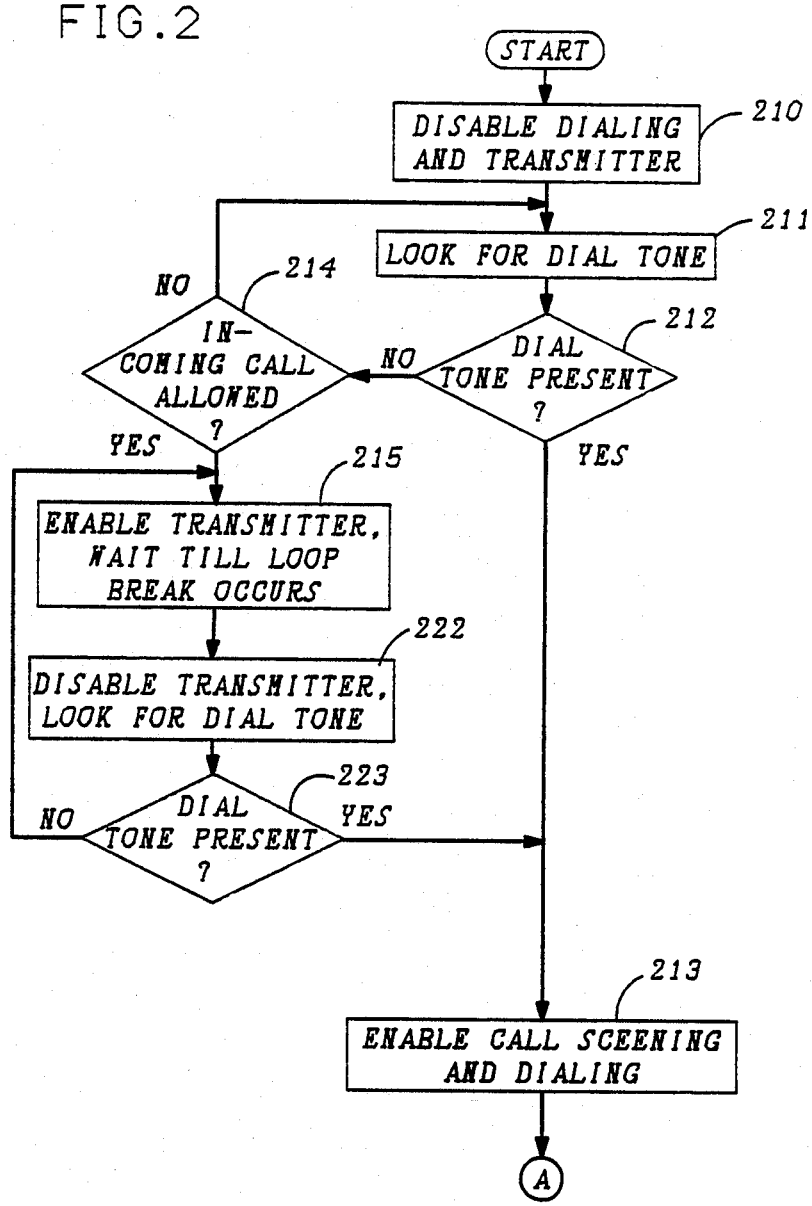
FIGS. 2 through 4 show flow charts of some of the functions performed by the telephone station of FIG. 1 in accordance with the invention.
Figure 3:
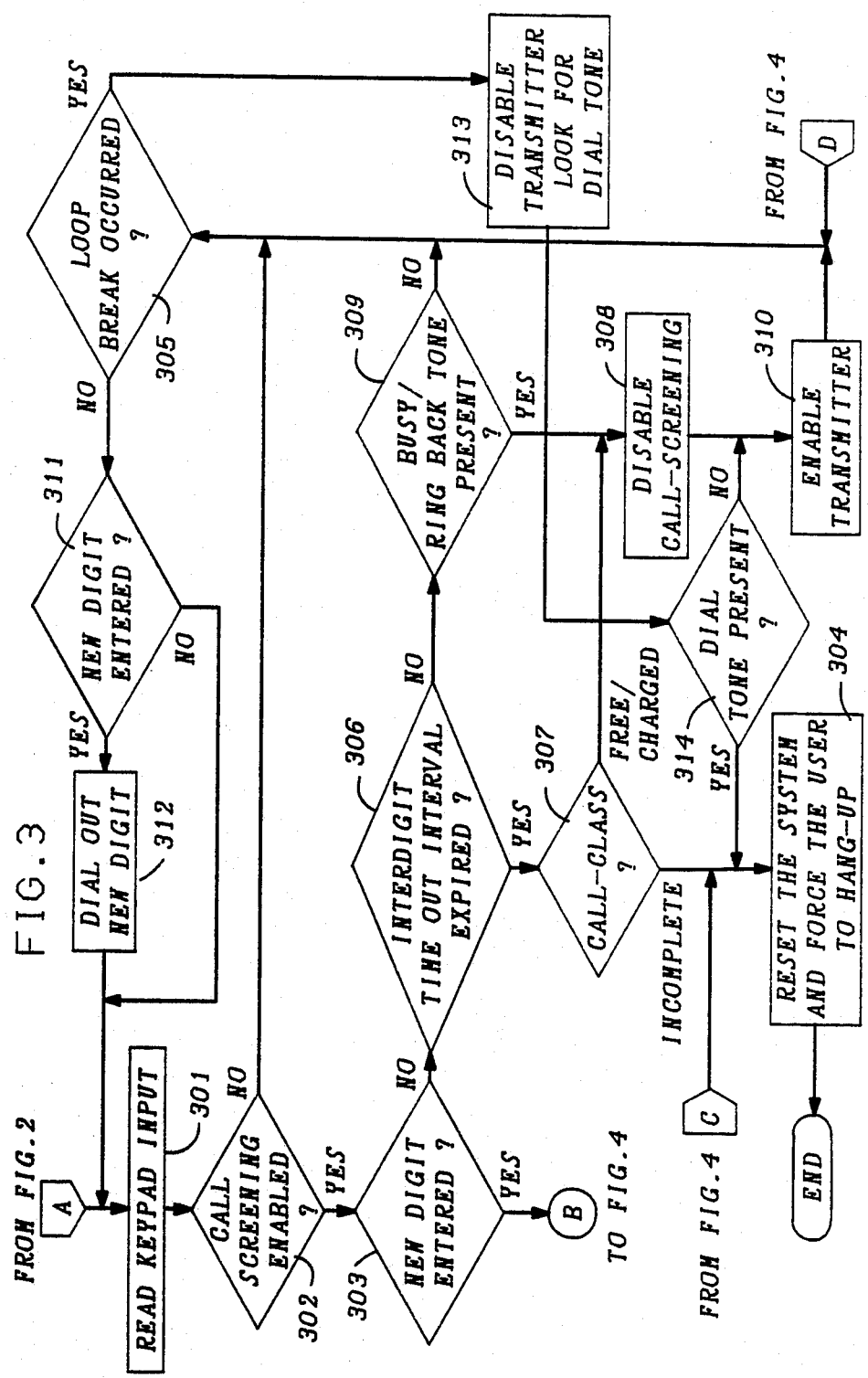
Figure 4:
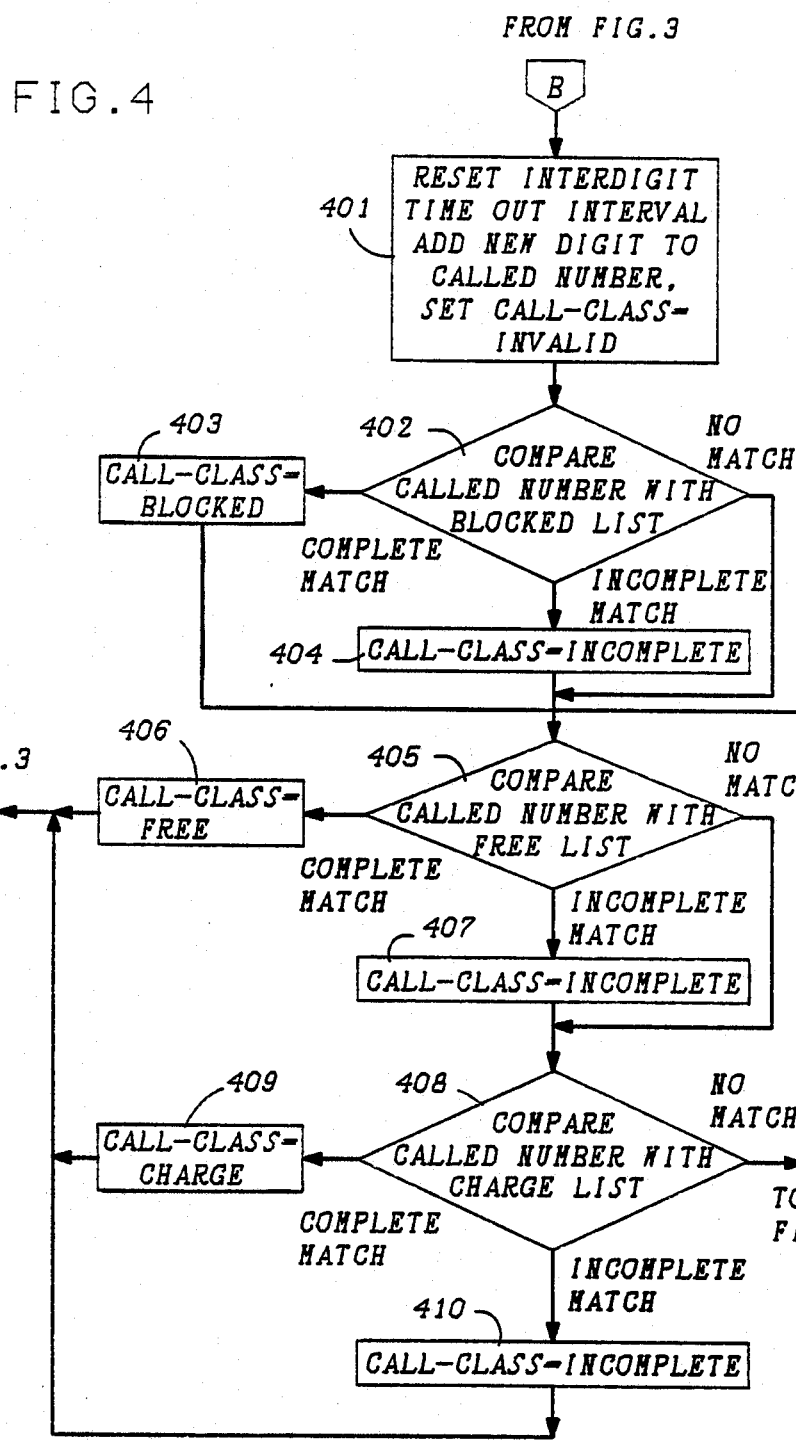

Referring now to FIGS. 2 through 4, there are shown flow-charts illustrating the operation of the telephone station of FIG. 1 in performing the call screening and fraud protection operations. The functions provided by CPU 106 are advantageously determined by a process or program stored in memory section 110. The process begins at step 210 where the dial and repertory key pads 122, 123 and the transmitter 126 are disabled when a user places the station off-hook. Disabling the transmitter insures that a user cannot fraudulently dial a telephone number using an acoustically coupled device. The process next advances to step 211 where the station waits a predetermined period for the receipt of dial tone. In this predetermined period, the dial tone should appear within typically two seconds and remain for typically 200 milliseconds in order to satisfy the criteria that dial tone is present. These times can be changed to accommodate different central office equipment.

The process next advances to the decision 212. If the dial tone has appeared within the time period determined by step 211, the call is classified as outgoing and the process advances to step 213, explained later herein. On the other hand, if the dial tone has not appeared within the time period, the call is classified as incoming and the process advances to decision 214. This decision determines whether to allow or not allow the incoming call from a remote telephone station. Allowing or not allowing incoming calls is an optional feature of the telephone station easily selectable by the owner or lessee of the station simply setting an appropriate flag in the program. If the incoming call is not allowed, the process returns to step 211 where the station once again waits for the receipt of dial tone. This loop is repeated until the calling party at the distant end hangs up and the attempted call is terminated.

If incoming calls are allowed, the process advances from decision 214 to step 215, where the transmitter is enabled and the station begin to monitor the tip and ring lines for a loop break. When the calling party hangs up at the end of a call, there is an opportunity for fraud if the central office simply returns dial tone and the station does not detect and react to it in some way. For example, if the station is fully activated when dial tone returns and remains so, a user could potentially place a telephone call without paying for it. The process then remains at this step looking for a loop break while the calling and called parties converse. Once the calling party at the remote telephone station hangs up, the central office sends a loop break followed by dial tone.

When a loop break occurs, the process advances to step 222 wherein the transmitter is disabled and the station awaits a predetermined period, approximately 500 milliseconds, for the receipt of dial tone. The dial tone should also remain for 200 milliseconds in order to satisfy the criteria that dial tone is present. Again, these times are typical. The process next advances to decision 223, where it is determined whether the dial tone has appeared within the time period determined by step 222. If the dial tone is determined to be present, then the process advances to step 213, wherein call screening is enabled and the call is treated as an outgoing call. If dial tone is not present, then the process returns to step 215, wherein the transmitter is enabled by the station and the parties are again allowed to converse. The receiver 125 is enabled by the station throughout the process.

That part of the process involved in placing an outgoing call essentially starts at step 213, where a call screening routine is enabled and the dial and repertory key pads are enabled for dialing. The process next advances to step 301 in FIG. 3 where any inputs provided by a user to the dial and repertory key pads are read. After this step, the process advances to decision 302 and determines if call screening is then enabled. If call screening is enabled, the process advances to step 303 where a determination is made as to whether a new digit has been entered into the key pad in accordance with step 301. If a new digit has been entered, the process advances to step 401 shown in FIG. 4. In this step, the interdigit time out interval, which may vary and is typically three seconds following a zero if it is the first digit dialed and ten seconds in all other cases, is set and the new digit added to the called number. If the new digit entered is the first of the series of digits to be entered, then it comprises the first digit of the called number and subsequent digits are added to this number as they are entered. In addition, the classification of the call or call-class is initialized in this step and set as being invalid.

The process next advances to step 402, where the called number, including the new digit that is entered, is compared to other numbers stored in a look-up table in EEPROM 113 (FIG. 1) to determine if the series of digits entered in the called number thus far matches any of the numbers that are on a blocked list. Numbers on this blocked list are not permitted to be dialed out by the customer owned telephone station. Whenever such a match occurs, the process advances to step 403. By way of example, if the first digit entered on the key pad completely matches a single digit telephone number on the blocked list, the process advances to the step 403 and the called class is classified as blocked. The digit is not dialed, instead, the process next advances to step 304 in FIG. 3 where the system is reset and the user is forced to go on hook and, if desired, begin a new call.

If, on the other hand, the series of digits being entered in the called number only partially matches a corresponding series of digits found in a larger number on the blocked list, the call class is temporarily classified as incomplete in step 404. This classification continues to be assigned the called number until sufficient digits are entered to either match the number on the blocked list or determine that the called number does not match any of the numbers on this list. In this later case, when there is no match between the digits dialed and those that are in the look-up table, the call class remains classified as invalid.

The process advances from decision 402, when the call class is classified invalid, and from step 404, when the call class is considered incomplete, to decision 405 where the called number is compared with a free list in the look-up table also in EEPROM 113. The comparison operation in decision 405 is similar to the comparison operation in decision 402, the difference being that the series of digits in the called number are compared with a similar number of digits in each of the numbers that are on a free list. If there is a complete match of the dialed digits with the numbers stored in this look-up table, the call class is considered free and the process advances to step 406. If there is an incomplete match of the dialed digits and the numbers stored in the look-up table, the process advances to step 407 where the call class is classified as incomplete. On the other hand, if there is no match between the dialed digits and the number stored in the look-up table represented by the decision 405, the call class remains classified as invalid and the process advances to decision 408.

At decision 408 the dialed digit or series of digits are compared with a charge list stored in a look-up table in the EEPROM 113 in the same manner as in decisions 402 and 405. If there is a complete match of these digits the call class is considered a charge call and the process advances to step 409. On the other hand if there is an incomplete match, the call class is considered incomplete, and the process advances to step 410. If there is no match of the numbers stored in the look-up table at this point, the call class is considered invalid, the last digit is not dialed, and the process advances to step 304, where the system is reset and the user is forced to hang up.

It is not practical from a memory storage standpoint to list all possible telephone numbers and compare them against the number being dialed. By way of example, assume two digits are stored per byte, a list of all possible seven-digit (local) numbers would require four million bytes of storage. For ten-digit (long distance) numbers, 640 million bytes would be needed. The required storage would be larger if there were not restrictions on telephone numbers in North America. (The first digit of an area code must be from two through nine; the second digit must be zero or one; and the first digit of an exchange must be from two through nine.)

To reduce the storage requirements to a practical size, a more general pattern matching scheme must be employed to decide if a dialed number is allowed. For example, in addition to the digits zero through nine, symbols that represent combinations of digits may be stored. The symbols P, N, and X are convenient for the North American dialing plan and may be used; other symbols may be defined for other parts of the world. P would match either a zero or a one; N would match one of the digits two through nine; and X would match any digit. Thus, P-609-XXX-XXXX matches any number in the 609 area code, whether preceded by a zero or a one; and P-NPX-XXX-XXXX matches any number outside the local area code. (The dashes in these numbers have been added to enhance readability; they do not appear in the actual table.)

There is a significant difference between the pattern P-609-XXX-XXXX and P-609. The former matches 11-digit numbers beginning 0609 or 1609; while the second matches the 4-digit numbers 0609 and 1609. The longer pattern is usable on a PBX line to block calls to the 609 area code, while allowing calls to the extensions 0609 and 1609. To accomplish this, the pattern P609 is included in the free call table and P-609-XXX-XXXX included in the blocked call table.

From the steps call class equal free 406, call class equal charge 409 and call class equal incomplete 410, the process advances to decision 305 (shown in FIG. 3) where the telephone connection between the central office and the station is monitored. This decision provides an interrupt indication reflective of a loop break occurring on the tip and ring lines. The loop break interrupt indication may occur at any time in the program, however, since the telephone connection is continually monitored. If a loop break has not occurred in decision 305, the new digit entered on the key pad in step 301 is dialed out over the tip and ring lines to the central office once it passes the call class test described by steps in decisions 402 through 410. Thus each digit is separately dialed out shortly after it is entered.

If a new digit is not entered in step 303, the process advances to step 306, where the interdigit time-out interval is checked. If there is time remaining on this interdigit time-out interval, the process advances to the decision 307 where the call class is examined and a determination made as to whether the call class is free or charged. If it is determined to be either of these two, the process advances to step 308. On the other hand, if the call class is considered incomplete at this point, the process advances to step 304, where the user is forced to go on hook and the system is reset. If the interdigit time-out interval has not expired, the process advances to decision 309, where the tip and ring lines are monitored for a ring back or busy tone being received from the central office. If either of these tones is being received, the process assumes that the dialing has been completed and the process advances to step 308, where call screening is disabled. On the other hand if the busy or ring back tone is not present, the process advances to decision 305 where the service line is monitored for a loop break.

At step 308, call screening is disabled and the process advances to step 310, wherein the transmitter is enabled. At this juncture in the program, any additional digits such as, for example, for a charge card number or other numbers representing access requirements at the called station may be entered. The process at this point thus remains in a waiting loop pending receipt of a loop break occurring or a new digit being entered. This waiting loop comprises the decisions 305 and 311, steps 312 and 301, and the call screening enabled decision 302.

When a loop break occurs, the waiting loop is interrupted and the process advances to step 313 wherein the transmitter is disabled and the station awaits a predetermined period, typically 500 milliseconds, for the receipt of dial tone. The period allows false loop breaks to occur without resetting the system. The dial tone should appear within the 500 milliseconds and also remain for 200 milliseconds in order to satisfy the criteria that dial tone is present. (Again, the times are typical.) The process next advances to decision 314, where it is determined whether the dial tone has appeared within the time period determined by step 313.

If dial tone does not appear in the time period, the proces returns to step 310, wherein the transmitter is enabled by the station and the parties are again allowed to converse. On the other hand, if dial tone does appear in the time period determined by step 313, the process advances to step 304 wherein the user is forced to go on-hook.

Various modifications of this invention are contemplated and may obviously be resorted to by those skilled in the art without departing from the spirit and scope of the invention as hereinafter defined by the appended claims.

What is claimed is:

1. A circuit for use in a telephone station for restricting selected telephone calls originating at the station, the station having a pair of lines for connecting to a switching facility and establishing a telephone connection, the circuit comprising:
   a plurality of memory means for containing data reflective of telephone numbers categorized in distinct groupings, the plurality of memory means including;
   a first memory means for containing data reflective of a group of telephone numbers to which no calls may be made;
   a second memory means for containing data reflective of a group of telephone numbers to which free calls may be made;
   a third memory means for containing data reflective of a group of telephone numbers to which charge calls may be made; and
   the circuit further comprising comparison means for comparing each digit of a telephone number entered at the station with data reflective of a digit having a positional correspondence respectively within each memory means to the entered digit, a favorable comparison of the entered digit and the data in the first memory means preventing the completion of a telephone call, a favorable comparison of the entered digit and the data in the second and third memory means enabling the entered digit to be transmitted by the station over the pair of lines to the switching facility.

2. A circuit as in claim 1 wherein the comparison means compares each digit with the data in the plurality of memory means as each digit is entered into the station.

3. A circuit as in claim 2 wherein each digit is individually transmitted to the switching facility by the station immediately upon receiving a favorable comparison in the second and third memory means.

4. A circuit as in claim 3 further comprising:
   means for receiving a loop break from the switching facility, the loop break being reflective of a momentary interruption in the telephone connection;
   means for receiving a dial tone signal from the switching facility; and
   means for terminating the telephone connection between the telephone station and the switching facility, the means for terminating being provided in response to the joint reception of the loop break and the dial tone signal from the switching facility.

5. A method of restricting selected telephone calls originating at a telephone station, the station having a pair of lines for connecting to a switching facility and establishing a telephone connection, the method comprising the step of:

entering into a plurality of memories data reflective of telephone numbers categorized in distinct groupings, the plurality of memories including;

a first memory containing data reflective of a group of telephone numbers to which no calls may be made;

a second memory containing data reflective of a group of telephone numbers to which free calls may be made;

a third memory containing data reflective of a group of telephone numbers to which charge calls may be made;

the method further comprising the steps of:

comparing each digit of a telephone number entered at the station with data reflective of a digit having a positional correspondence repectively within each memory to the entered digit;

providing a signal in the station in response to a favorable comparison of the entered digit and the data in the first memory for preventing the completion of a telephone call; and transmitting the entered digit by the station over the pair of lines to the switching facility in response to a favorable comparison of the entered digit and the data in the second and third memory.

6. The method as in claim 5 wherein in the comparison step, each digit is compared with the data in the plurality of memories as the digit is entered into the station.

7. The method as in claim 6 wherein in the transmission step, each digit is individually transmitted to the switching facility by the station immediately upon receiving a favorable comparison in the second and third memories.

8. The method as in claim 7 further including the steps of:

establishing the telephone connection between the telephone station and the switching facility over the pair of lines;

receiving a loop break from the switching facility, the loop break being reflective of a momentary interruption in the telephone connection;

receiving a dial tone signal from the switching facility; and terminating the telephone connection between the telephone station and the switching facility, the terminating step occurring in response to the joint reception of the loop break and the dial tone signal from the switching facility.

9. The method of claim 8 wherein the establishing step includes in order the steps of receiving an initial dial tone for the placing of a telephone call to a remote telephone station through the switching facility, and dialing the telephone number associated with the remote telephone station.

10. The method of claim 8 wherein the terminating step further includes the stgep of disabling a telephone transmitter associated with the telephone station.

11. A circuit for use in a telephone station for restricting selected telephone calls originating at the station, the station having a pair of lines for connecting to a switching facility and establishing a telephone connection, the circuit comprising:

a plurality of memory means for containing data reflective of telephone numbers categorized in distinct groupings, the plurality of memory means including:

a first memory means for containing data reflective of a group of telephone numbers to which no calls may be made;

a second memory means for containing data reflective of a group of telephone numbers to which calls may be made;

the circuit further comprising comparison means for comparing each digit of a telephone number entered at the station with data reflective of a digit having a positional correspondence respectively within each memory means to the entered digit, a favorable comparison of the entered digit and the data in the first memory means preventing the completion of a telephone call, a favorable comparison of the entered digit and the data in the second memory means enabling the entered digit to be transmitted by the station over the pair of lines to the switching facility.

12. A method of restricting selected telephone calls originating at a telephone station, the station having a pair of lines for connecting to a switching facility and establishing a telephone connection, the method comprising the step of:

entering into a plurality of memories data reflective of telephone numbers categorized in distinct groupings, the plurality of memories including;

a first memory containing data reflective of a group of telephone numbers to which no calls may be made;

a second memory containing data reflective of a group of telephone numbers to which calls may be made;

the method further comprising the steps of:

comparing each digit of a telephone number entered at the station with data reflective of a digit having a positional correspondence respectively within each memory to the entered digit;

providing a signal in the station in response to a favorable comparison of the entered digit and the data in the first memory for preventing the completion of a telephone call; and transmitting the entered digit by the station over the pair of lines to the switching facility in response to a favorable comparison of the entered digit and the data in the second memory.

* * * * *